United States Patent [19]

Bamber

[11] Patent Number: 5,460,472

[45] Date of Patent: Oct. 24, 1995

[54] CARTOP HOIST AND CARRIER

[76] Inventor: Ronald Bamber, 128AA Deer Run Rd., Millerton, N.Y. 12546

[21] Appl. No.: 344,726

[22] Filed: Nov. 23, 1994

[51] Int. Cl.⁶ .................................. B60P 3/10; B60P 1/54
[52] U.S. Cl. .......................... 414/462; 212/180; 414/543
[58] Field of Search ........................... 212/180; 224/309, 224/310; 414/543, 462

[56] References Cited

U.S. PATENT DOCUMENTS

| 3,215,294 | 11/1965 | Salamin | 414/462 |
| 3,608,759 | 9/1971 | Spurgeon et al. | 414/462 |
| 4,003,485 | 1/1977 | Edgerton | 414/462 |
| 4,139,110 | 2/1979 | Roberts | 414/462 |
| 4,272,218 | 6/1981 | Carter | 414/462 |

Primary Examiner—Michael S. Huppert
Assistant Examiner—Janice L. Krizek

[57] ABSTRACT

A cartop hoist and carrier apparatus has a crane rotatably mounted on a frame that is adapted to be secured to the top of an automotive vehicle. The crane has two spaced apart suspension points for two respective hoisting lines that are led to a winch for simultaneous hauling in or paying out. The two hoist lines provide stability to an elongated load against both tilting and twisting. When the frame is mounted on a vehicle roof, the crane can be swung outboard to raise an elongated load, such as a canoe, from alongside the vehicle. The crane can then be swung inboard and the load lowered to rest on the frame.

5 Claims, 2 Drawing Sheets

CARTOP HOIST AND CARRIER

BACKGROUND OF THE INVENTION

1. Field of the Invention

The present invention relates to apparatus for raising and lowering an elongated object, such as a canoe or other type of small boat. The invention relates particularly to such apparatus that allows one person to accomplish the raising and lowering operations to and from a carrier mounted on top of an automotive vehicle.

2. Background Art

Raising and lowering a canoe or other type of small boat to and from a cartop rack is a difficult operation for two persons. Various types of apparatus have been developed to make the task easier and safer. Most of these apparatuses provide a ramp for sliding the load either from the end or the side of the vehicle. U.S. Pat. No. 4,003,485 of Edgerton discloses a vehicle-top loader in the form of a rectangular frame carriage equipped with wheels that allow the carriage to roll laterally on parallel transverse rails of a vehicle rack. For single person unloading, the person must lift one end of the carriage over stops on the rails and then roll the carriage across the rack on the wheels at the other end until they hit the stops. The person must then lower the one end to pivot the carriage downward to a slant position alongside the vehicle, allowing a load on the carriage to be removed.

From the time of lifting over the end stops until the carriage rests in the slant position, the person must support and maneuver the one end of the carriage with the load on it. The Edgerton apparatus includes an extendable lever and a pivoted support leg to aid in this operation, but manipulation of these elements while holding up one end of the carriage requires dexterity and strength. If the person should let go during the pivoting movement, the carriage possibly could swing into the side of the vehicle. It is desirable, therefore, to provide an apparatus that maintains positive control over the position of the load at all times and that requires minimal strength to operate.

SUMMARY OF THE INVENTION

The principal object of the present invention is to provide a simple apparatus to permit one person with little effort to raise and lower an elongated object, such as a canoe or other type of boat, between a position alongside a vehicle and a position on the vehicle roof with the apparatus maintaining the load under positive control throughout the operation.

Other objects of the invention are to provide such an apparatus that is relatively lightweight yet strong and rugged, that requires minimum vertical clearance, that is easy for one person to operate, and that requires little storage space when not in use.

These objects are achieved by apparatus according to the present invention that includes:

a frame having a longitudinal dimension and a transverse dimension perpendicular to the longitudinal dimension;

a crane mounted on the frame for rotation about an axis perpendicular to a plane defined by the longitudinal and transverse dimensions, the crane having first and second spaced apart suspension points located on opposite sides of a plane containing the axis of rotation of the crane;

a first pulley located at the first suspension point;

a second pulley located at the second suspension point;

first and second hoisting lines passed over the respective first and second pulleys, each hoisting line having a load attachment end and a hauling end; and a hoisting device connected to the hauling end of each line for pulling in or paying out the first and second lines simultaneously at equal rates.

DETAILED DESCRIPTION OF THE PREFERRED EMBODIMENT

Figure 1:
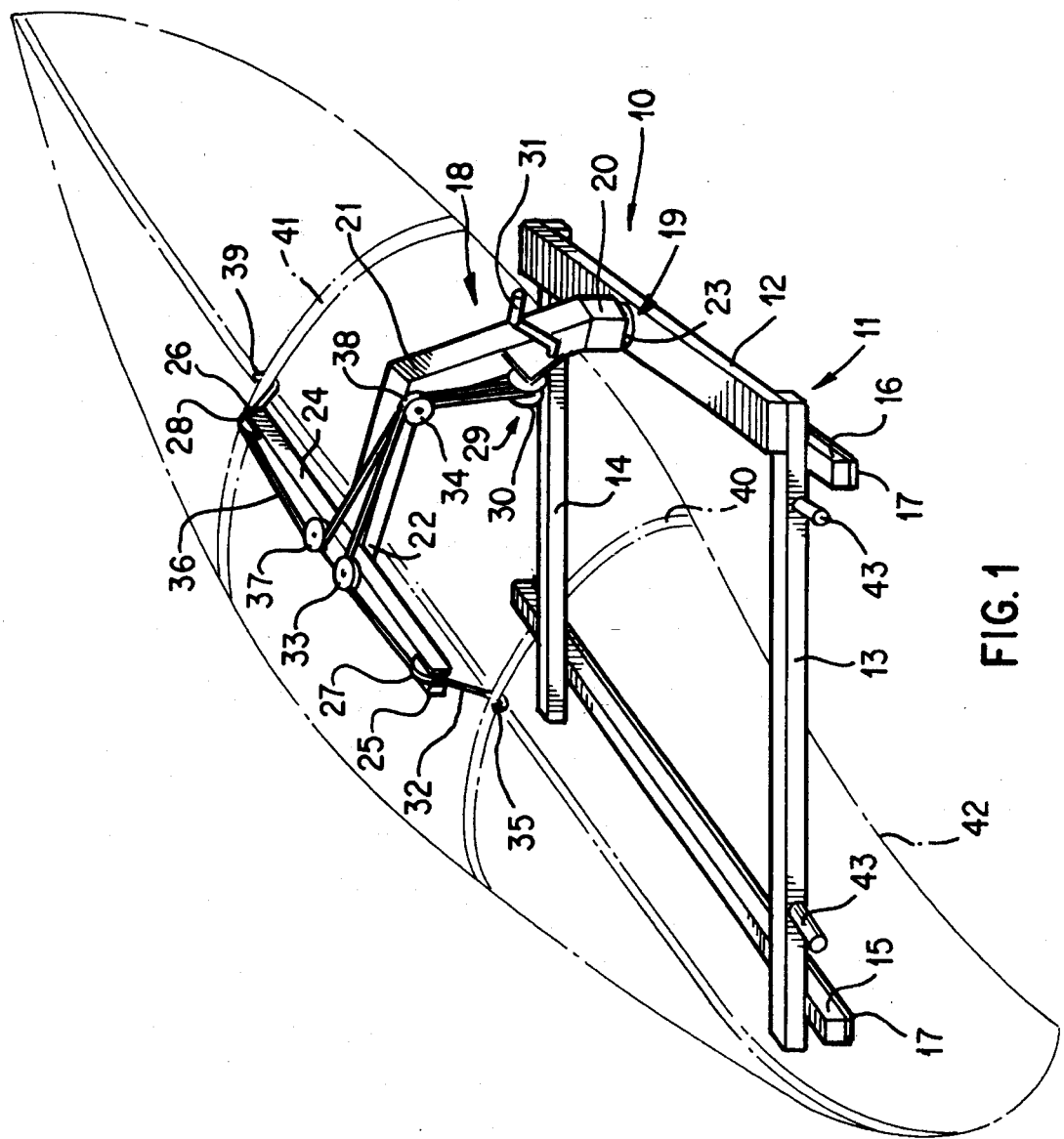
FIG. 1 is a perspective view of an apparatus according to the invention.

FIG. 1 shows a preferred embodiment of an apparatus 10 according to the invention. The apparatus 10 includes a frame 11 having a longitudinal member 12 defining a longitudinal dimension, a first transverse member 13 extending laterally from one end of the longitudinal member, and a second transverse member 14 extending laterally from an opposite end of the longitudinal member. The transverse members define a transverse dimension perpendicular to the longitudinal dimension.

The frame 11 is adapted to be mounted on the roof of an automotive vehicle by any suitable means, such as a pair of spaced longitudinal rails 15 and 16 fastened to the undersides of the transverse members. The rails 15 and 16 have strips of padding 17 glued to their bottom surfaces to prevent scratching the finish of the vehicle roof and can be secured to the roof by straps passed over the rails and through the open doorways of the vehicle (not shown).

A crane 18 mounted on the longitudinal member 12 between the transverse members 13 and 14 is supported by a bearing assembly 19 for rotation about an axis perpendicular to a plane defined by the longitudinal and transverse dimensions of the frame. The crane 18 has a trunk 20 and an arm 21 with an outer end 22. A hub 23 equipped with a stub spindle (not shown) turning in double tapered roller bearings (not shown), of the type used for lightweight utility trailer axles, provides a suitable rotary support for the crane. The hub bolts to the longitudinal member 12, and the stub spindle inserts into a mating hole bored into the trunk of the crane.

A boom 24 fixed to the outer end 22 of the crane arm has one end 25 on one side of and spaced from a plane containing the axis of rotation of the crane and the outer end of the crane arm. An opposite end 26 of the boom lies on the opposite side and is spaced in the same plane. The two ends 25 and 26 of the boom 24 serve as respective first and second suspension points, at which are located a respective first pulley 27 and second pulley 28.

A hoisting device such as a winch 29 has a drum 30 rotatably mounted on the trunk of the crane and a hand crank 31 for turning the drum. A first hoisting line 32, having a hauling end (not shown) secured to the drum 30, extends around fairleads 33 and 34 and over the first pulley 27 to terminate in a load attachment end 35. A second hoisting line 36, likewise having a hauling end (not shown) secured to the winch drum 30, extends around fairleads 37 and 38 and over the second pulley 28 to terminate in a load attachment end 39.

The load attachment ends 35 and 39 of the first and second lines can be hooked, or otherwise attached, to respective straps 40 and 41 encircling an appropriate load, such as a canoe 42 (all shown in dashed lines to avoid obscuring the structure of the apparatus). An elongated load attached to the two hoisting lines of the apparatus, led from two spaced apart suspension points, will not tilt or twist relative to the crane arm. This gives desirable stability when rotating the crane arm, so there is no need to hold the ends of the load.

When the canoe rests on the transverse members 13 and 14, it can be secured to the frame by slacking strap 40, then passing it under two transversely spaced pegs 43 extending longitudinally from an edge of the first transverse member 13 and retightening it. The strap 41 is similarly passed under corresponding pegs 44 (see FIGS. 4 and 5) extending from an edge of the second transverse member 14. The canoe can be prevented from shifting longitudinally on the frame by securing bow and stern lines to cleats mounted on the respective first and second transverse members. These lines and cleats are not shown on the drawing to avoid obscuring the structure with unnecessary detail.

Figure 2:
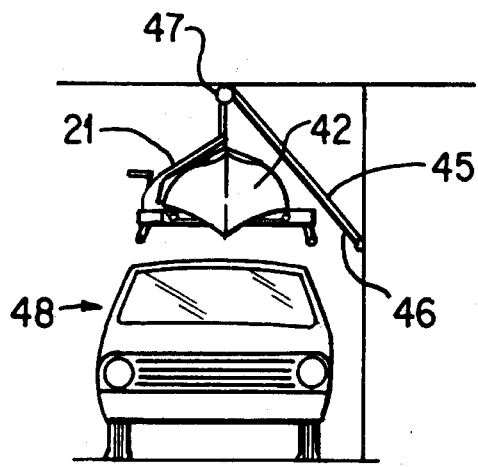
FIG. 2 is a front elevation view of a canoe attached to the apparatus of FIG. 1 in stored position over a vehicle parked in a garage.
Figure 3:
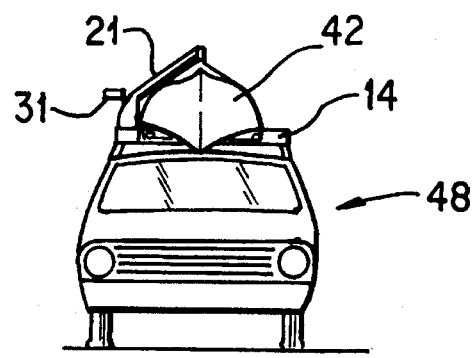
FIG. 3 is a front elevation view of the canoe and apparatus of FIG. 2 mounted on the vehicle ready for transport.

FIGS. 2 through 5 illustrate the preferred manner of storing and using the hoisting and transporting apparatus of the invention. FIG. 2 shows a canoe 42, secured to the apparatus 10 in the manner described in the preceding paragraph, stored out of the way by being hoisted by lines 45 and 46 passed through blocks 47 secured to the ceiling of a garage above the parking position of a motor vehicle 48. When it is desired to transport the canoe, the apparatus with canoe attached is lowered by lines 45 and 46 to the roof of the vehicle, where it is suitably secured, as by the arrangement described earlier. The lines 45 and 46 can then be detached and the vehicle driven away with the canoe secured on top, as shown in FIG. 3.

Figure 4:
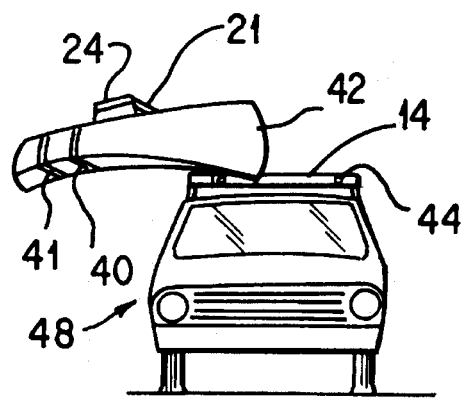
FIG. 4 is a front elevation view of the vehicle of FIG. 3 with the canoe partially swung out in preparation for lowering.

After arrival at the location for use, the bow and stern lines are uncleated from the transverse members 12 and 13, and the canoe is released from the frame by reaching underneath and slipping each of the straps 40 and 41 out from under the respective pegs 43 and 44. The canoe is then raised clear of the frame 11 by turning the hand crank 29 of the winch in the hoisting direction. Once clear of the frame, the canoe can be swung outboard, as shown in FIG. 4, by rotating the crane, which turns easily on its support bearing. FIG. 4 also helps to show the advantage of using two hoisting lines from respective first and second spaced apart suspension points on the crane. This arrangement provides a stable suspension of the canoe, to prevent both pitching and yawing motions with respect to the crane arm, thus allowing one person to safely and easily handle a clumsy elongated load without danger of its swinging into and damaging the vehicle.

Figure 5:
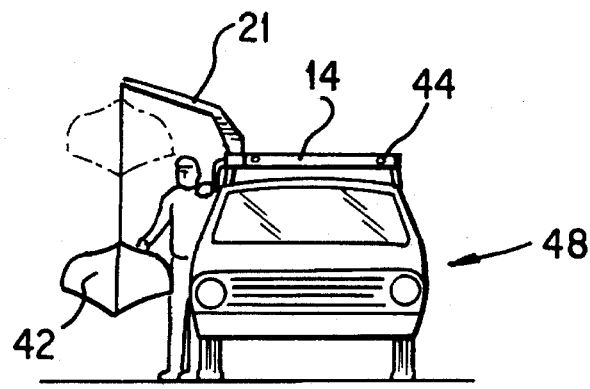
FIG. 5 is a front elevation view of the canoe being lowered.

After the canoe has been swung out to a position parallel to the vehicle, as shown in dashed lines in FIG. 5, it can be lowered, as shown in solid lines of FIG. 5, by turning the hand crank in the lowering direction. For safety, the winch should have a ratchet arrangement that functions for lowering as well as for raising.

After use, the canoe can be raised, secured to the top of the vehicle, and transported home by reversing the previous steps.

Although the structure of the apparatus shown in the drawings and described above is a preferred embodiment, many changes can be made within the scope of the invention. For example, a frame with only one transverse member may be sufficient to stably support the crane, but two spaced apart transverse members provide greater strength and rigidity and also more stable support for an elongated load, without requiring front and rear guy lines attached from the load to the front and rear bumpers or adjacent structure of the vehicle. Or instead of using a boom fixed to a single arm, the crane could be provided with two spaced apart suspension points by using two angularly spaced arms extending from the trunk of the crane. For greater ease of use, an electric motor drive could be substituted for the hand crank of the winch.

Other changes may suggest themselves to persons of ordinary skill, and the scope of the invention is intended to be limited only by the breadth of the following claims.

I claim:

1. An apparatus for raising a boat or other elongated object to the rooftop of an automobile, the apparatus comprising:

a frame adapted to be secured to the rooftop of an automobile, the frame having a longitudinal dimension and a transverse dimension perpendicular to the longitudinal dimension;

a crane mounted on the frame for rotation about an axis perpendicular to a plane defined by the longitudinal and transverse dimensions, the crane comprising an arm having an outer end located above the frame and spaced from the axis of rotation and an elongated boom having a first end and a second end, the boom being fixed between its first and second ends to the outer end of the arm and extending transversely to the arm;

a first pulley located at the first end of the boom;

a second pulley located at the second end of the boom;

first and second hoisting lines passed over the respective first and second pulleys, each hoisting line having a load attachment end suspended below the respective pulley for securing to longitudinally spaced apart attachment points on an elongated object; and a hoisting device for hauling in or paying out the first and second lines to raise or lower the load attachment ends simultaneously at equal rates, whereby the elongated object can be raised or lowered without tilting or twisting with respect to the boom.

2. The apparatus of claim 1 wherein the transverse dimension of the frame is defined by two spaced apart transverse members.

3. The apparatus of claim 1 wherein the frame comprises a longitudinal member and two spaced apart transverse members extending from opposite ends of the longitudinal member, and the crane is mounted on the longitudinal member between the transverse members.

4. The apparatus of claim 1 wherein the boom is perpendicular to a plane containing the outer end of the arm and the axis of rotation of the crane.

5. The apparatus of claim 1 wherein the hoisting device comprises a rotatable drum mounted on the crane, both the first and second lines being attached to the drum.

\* \* \* \* \*